United States Patent Office 2,881,014
Patented Apr. 7, 1959

2,881,014
ROTARY SHAFT SEAL

Maxime Amirault, Puteaux, and Paul Destoumieux, Neuilly-sur-Seine, France

Application April 12, 1954, Serial No. 422,631

Claims priority, application France January 23, 1954

7 Claims. (Cl. 286—11)

The present invention generally relates to improvements in frictional fluid-tight devices, placed between a revolving part and a fixed part, and more particularly with those intended to operate either in an acid or solvent or on revolvable parts having large diameters.

The known fluid-tight devices in general use on rotary members are, generally speaking, designed to operate in non-acid or non-solvent fluids, and are so constructed that they can be produced at a low cost. Their construction does not allow, however, either easy fitting up on large diameters or the utilization of materials that are resistant to acids or solvents.

In the devices according to the present invention embodiments thereof have been devised enabling materials to be used that resist corrosive fluids, and more particularly allow the use of plastic materials and lead in the construction thereof. Provision has also been made for fittings for ease of fixing these materials to the various parts of the device. By way of example, embodiments according to the invention are shown in the attached drawing, by Figures 1 to 7, which are axial cross-sections of the devices.

Figure 1:
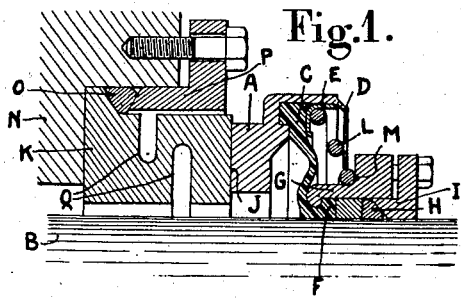

In Fig. 1, is shown a device according to the invention constructed, for example with a friction part or sealing ring A connected to a shaft B through the intermediary of an annular membrane or element C of flexible material, which can, for example, be a plastic material known in the trade under the name of "nylon," which resists the corrosive action of acids and solvents. The shaft B is rotatably mounted in a housing N and extends therefrom. The flexible element C is disposed externally of the housing N and has an axially extending sleeve portion closely surrounding the shaft B and terminating in a radial flange for mounting sealing ring A on element C so as to be rotatable therewith as later herein described. The flexible member C is provided with a radially, outwardly projecting rib or bead F spaced axially from said radial flange. Connection between the element C and the ring A is made by clamping a marginal rim of the radial flange of the flexible element C with a flanged member D and a crossbar E as shown. Connection of the flexible element or membrane C with the shaft B is made by rib F, of the sleeve portion of element C, which fits tightly on shaft B and is maintained clamped by a clamping ring G which engages an inner face of the rib and a second clamping ring or gland member I which engages an outer face of the rib F jointly with a lead ring H. This clamping ring G is itself solidly attached to the shaft B by means of the lead ring H held by the gland or stuffing-box part I. It being understood that the members G and I can be drawn toward one another to clamp the rib F between them and press the adjacent portion of the sleeve to provide a fluid tight seal between the shaft B and the flexible member C. A squared face or bearing surface J of the sealing ring A is pressed against another bearing surface squared face of an abutment member K by means of a spring L which abuts on a shoulder M of the clamping ring G and by its other end bears on the cross-bar E. The part K is releasably attached to the crankcase N by a lead ring O held by a stuffing-box P. When shaft B rotates the friction part or sealing ring A is driven with the shaft by means of the member C, and the face J slides on the part K frictionally engaging it providing a fluid-tight seal therebetween.

It will be noticed that an intermediate portion of the radial flange of member C disposed between the marginal rim of the flange and the sleeve portion of member C is very thin and thus affords great flexibility if this member is made of one of the hard materials capable of resisting acids or solvents, such as the material commercially known as "nylon."

In order to simplify the drawings the various corresponding parts or members have been similarly designated in all of the embodiments according to the invention. It will be understood that in each embodiment of the invention that compressible rings H and O for example, which effectively cooperate with other gland or stuffing-box elements I, P, as sealing rings are made of materials such as "nylon" or lead which can resist corrosive fluids such as acids and solvents.

To prevent the part K from becoming distorted when tightened by the stuffing-box P, radial slits Q can be made in this part K. As will be seen from the drawing the slots Q extend through a major portion of the thickness of the abutment member K to provide an intermediate flexible portion between an outwardly projecting flange portion engaged by the ring O and the bearing face J. By reason of the flexibility thus provided any minor distortion of the axially inner part of the abutment member K that may result from the tightening of the screw studs of the stuffing-box P is not transmitted to the axially outer part of the abutment member carrying the bearing face J. The bearing face is hence not distorted and remains true.

Figure 2:
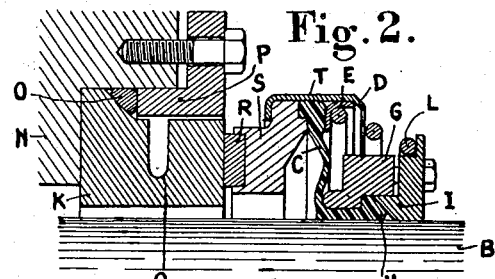

The construction shown in Figure 2 is a variant comprising improvements on the embodiment shown in Figure 1. For example, a friction element R is adhesively attached, according to a known method, on a sealing ring S which is fixed to the flexible member C, by means of a casing element T. The element C is in this embodiment held fixed on shaft B by clamping ring G and gland element I by clamping a rib or bead U on element C which in this instance is made of a material such as nylon.

Figure 3:
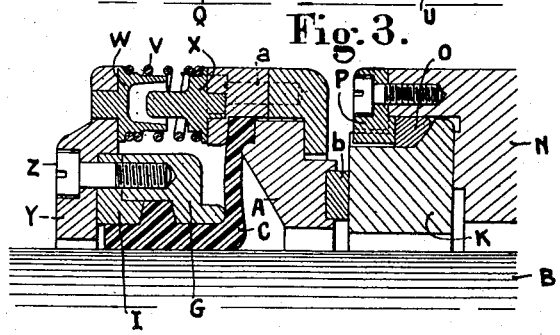

Figure 3 is a somewhat similar embodiment as that of Fig. 2, but is specially devised for use on large diameter shafts. More particularly, the sealing ring A is adjustably fixed on the member C by means of a screw $a$, instead of the means generaly used, and, small diameter spiral springs V, are placed on the periphery of the assembly, and consequently capable of being a somewhat large number so as to afford a suitable resilience, and load distribution on the device. These springs are placed on bosses W and X which fit into each other to act as a positive drive in the event of large friction torques, for example, when starting. These springs can be compressed by a part Y when the assembly has been fixed on the shaft by the stuffing-box I and can be tightened by the screws Z screwed into ring G and thus enabling easy positioning thereof. The annular friction part $b$ cooperating with the ring A, is pressed on an abutment K to effect a fluid-tight seal. The latter is fixed to the crankcase or housing N by the lead ring O tightened by the stuffing-box P, exactly like the preceding embodiments.

The invention also makes provision for simpler embodiments.

Figure 4:
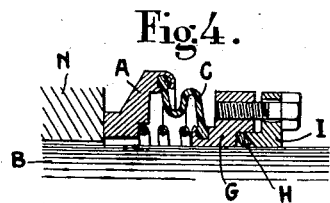
Figure 5:
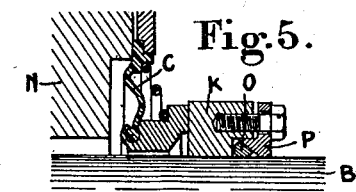

For example, in the embodiment shown in Figure 4, the member C consists of several folds and is fixed at both ends, on the one hand, on the sealing ring A, and on the other hand, on the clamping ring G fixed to the shaft B by a ring H and a stuffing-box I. In the form of embodiment shown in Fig. 5, the member C, which is flat at one end, can be directly fixed on the crankcase N. In this case, it is the abutment K which is fixed to the shaft B, for rotary movement. Still simpler assemblies can be produced, such as those in Figure 6 and Figure 7, where the clamp ring G is attached to the shaft B by simply tightly fitting the ring on the shaft.

Figure 6:
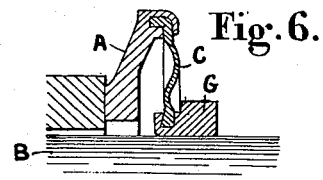
Figure 7:
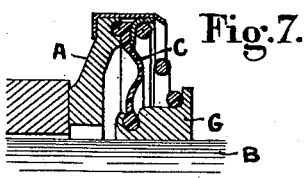

It will also be noticed that in the embodiment of Figure 6, there is no spring, the functions of the springs of the other embodiments being carried out by the member C whose shape lends itself to being stamped out of metal.

Within the scope of the present invention, various forms of embodiment can be produced, more particularly by utilizing metal membranes, which can operate like a Belleville washer, or of elastic material other than "nylon" or rubber, for example. "Teflon," vinyl chloride, Thiokol, silicone, etc.; by employing materials other than lead or "nylon" for stuffing-box packing; by angular connections between the sealing ring and the periphery members other than those shown in Figure 3, or by carrying out attachment to the shaft by provision being made on the shaft, the crank case or vice-versa, and by making use of leaf or any other type of springs.

What we claim is:

1. In combination with a housing and a shaft rotatably mounted in said housing and extending therefrom, means providing a fluid tight seal between the shaft and housing comprising an annular abutment member surrounding said shaft and having an annular radially extending bearing surface, means removably mounting said abutment member on the housing with a fluid tight seal therebetween, a sealing ring surrounding said shaft and having an annular radially extending bearing surface engaging said bearing surface of the abutment member, an annular flexible element disposed externally of the housing and having an axially extending sleeve portion closely surrounding said shaft and a flexible radially extending flange portion, means clamping an outer peripheral portion of said flange portion to said sealing ring with a fluid tight seal therebetween, said sleeve portion having a radially outwardly projecting rib spaced axially from said flange, a first clamping ring surrounding said sleeve portion and engaging an axially inner face of said rib, a second clamping ring engaging an axially outer face of said rib, means for drawing said clamping rings toward one another to clamp said rib between them and press thhe adjacent portion of said sleeve against the shaft to provide a fluid tight seal between said shaft and flexible member, and means biasing said sealing ring axially toward said abutment member to provide fluid tight interengagement of said bearing surfaces.

2. A combination according to claim 1, in which the outer peripheral portion of the flange portion of the flange portion of said flexible element is thicker in an axial direction than an annular intermediate portion between said peripheral portion and said sleeve portion, said thinner intermediate portion providing flexibility of said flange portion.

3. In combination with a housing and a shaft rotatably mounted in said housing and extending therefrom, said housing having a recess surrounding said shaft, means providing a fluid tight seal between the shaft and housing comprising an annular abutment member surrounding said shaft and having a flange portion seated in said recess and an annular radially extending bearing surface, clamping means engaging said flange portion to clamp said abutment member on the housing with a fluid tight seal therebetween, a sealing ring surrounding said shaft and having an annular radially extending bearing surface engaging said bearing surface of the abutment member, an annular flexible element disposed externally of the housing and having an axially extending sleeve portion closely surrounding said shaft and a flexible radially extending flange portion having a peripheral rim portion, means clamping said rim portion to said sealing ring with a fluid tight seal therebetween, said sleeve portion having a radially outwardly projecting rib spaced axially from said flange, a pair of clamping rings engaging the axially inner and axially outer faces of said rib respectively, means for drawing said clamping rings toward one another to clamp said rib between them and press an adjacent portion of said sleeve against the shaft to provide a fluid tight seal between the shaft and said flexible member, and resilient means biasing said sealing ring axially toward said abutment member to provide fluid tight interengagement of said bearing surfaces.

4. A combination according to claim 3, in which said clamping means for said abutment member comprises an annular clamping member and a sealing ring disposed between said clamping member and said flange portion of the abutment member, said sealing ring being formed of firm resilient material resistant to attack by acids and corrosive fluids.

5. A combination according to claim 3, in which said abutment member has at least one annular slot between said flange portion and bearing surface of said abutment member, said slot extending radially through a major portion of the radial thickness of said abutment member to provide an intermediate portion having sufficient flexibility that any minor distortion of said flange portion of the abutment member by the associated clamping means is not transmitted to the bearing surface.

6. In combination with a housing and a shaft rotatably mounted in said housing and extending therefrom, means providing a fluid tight seal between the shaft and housing comprising an annular abutment member surrounding said shaft and having an annular radially extending bearing surface, means removably mounting said abutment member on the housing with a fluid tight seal therebetween, a sealing ring surrounding said shaft and having an annular radially extending bearing surface engaging said bearing surface of the abutment member, an annular flexible element disposed externally of the housing and having an axially extending sleeve portion closely surrounding said shaft and a flexible radially extending flange portion, means clamping an outer peripheral portion of said flange portion to said sealing ring with a fluid tight seal therebetween, said sleeve portion having a radially outwardly projecting rib spaced axially from said flange, a first clamping ring surrounding said sleeve portion and engaging an axially inner face of said rib, a second clamping ring engaging an axially outer face of said rib, means providing a fluid tight seal between said first clamping ring and the shaft, means for drawing said clamping rings toward one another to clamp said rib between them, and resilient means biasing said sealing ring axially toward said abutment member to provide fluid tight interengagement of said bearing surfaces.

7. In combination with a housing and a shaft rotatably mounted in said housing and extending therefrom, means providing a fluid tight seal between the shaft and housing comprising an annular abutment member surrounding said shaft and having an annular radially extending bearing surface, means removably mounting said abutment member on the housing with a fluid tight seal therebetween, an annular flexible member disposed externally of said housing and having an axially extending sleeve portion closely surrounding said shaft and a flexible flange portion extending radially outwardly from said sleeve portion, said flexible element being formed of firm resilient material having the characteristic of resisting attack by acids and corrosive fluids, a sealing ring carried on the peripheral portion of said flange portion and having an annular radially extending bearing surface engaging the bearing surface of the abutment member, said sleeve portion of the flexible member having a radially outwardly projecting rib spaced axially from said flange portion, a pair of clamping rings engaging opposite faces of said rib to clamp said rib between them, means providing a fluid tight seal between at least one of said clamping rings and the shaft and means biasing said sealing ring axially toward said abutment member to provide a fluid tight engagement between said bearing surfaces.

References Cited in the file of this patent

UNITED STATES PATENTS

| | | |
|---|---|---|
| 1,825,918 | Peltier et al. | Oct. 6, 1931 |
| 1,931,723 | Fageol et al. | Oct. 24, 1933 |
| 2,646,296 | Destoumieux et al. | July 21, 1953 |

FOREIGN PATENTS

| | | |
|---|---|---|
| 130,359 | Australia | Nov. 30, 1948 |